Feb. 27, 1962 K. H. HANSEN ET AL 3,022,847
MOTOR VEHICLE CONSTRUCTION
Filed Sept. 16, 1959 2 Sheets-Sheet 1
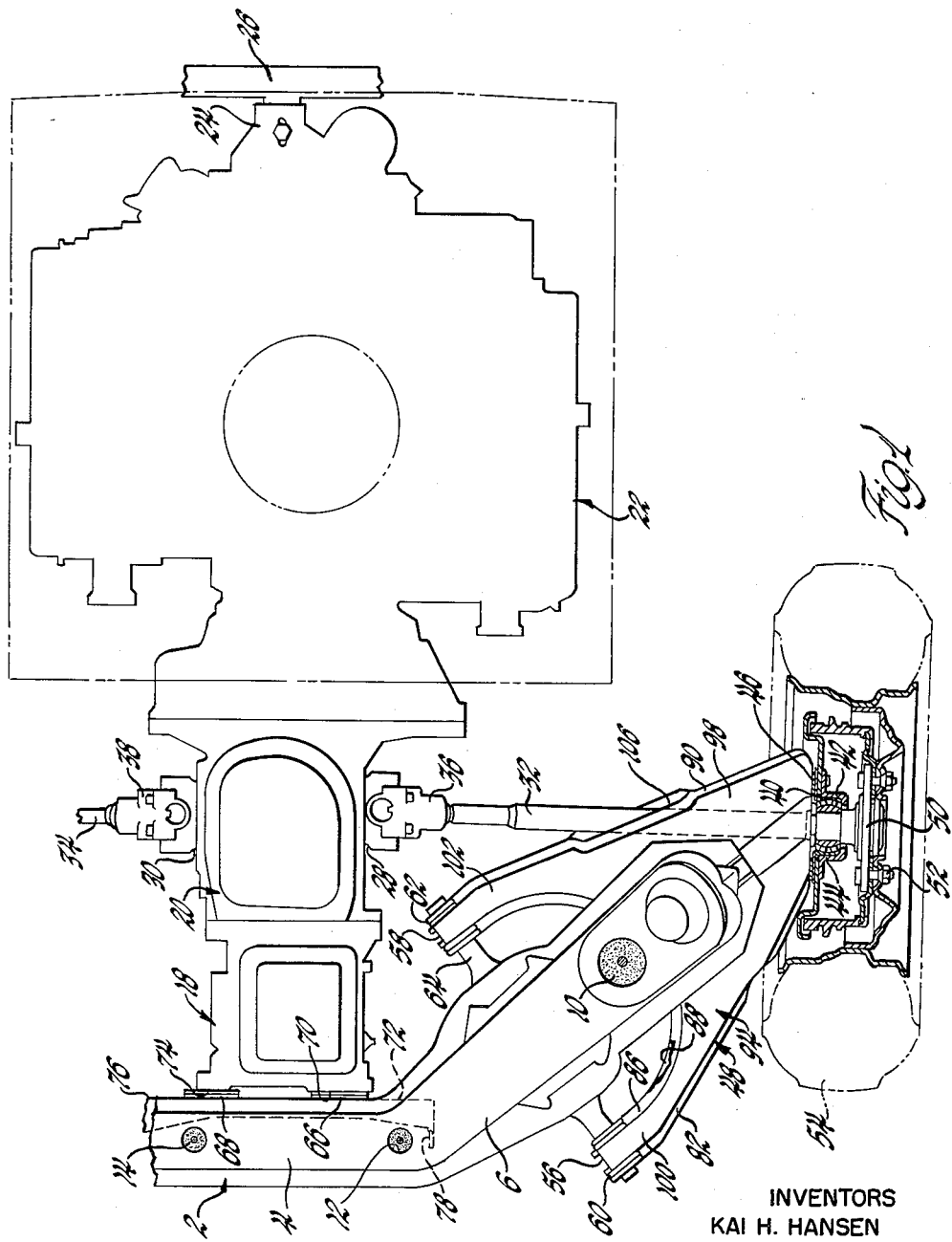
INVENTORS
KAI H. HANSEN
ROBERT SCHILLING
JOHN McROBERTS
BY W. F. Wagner
ATTORNEY

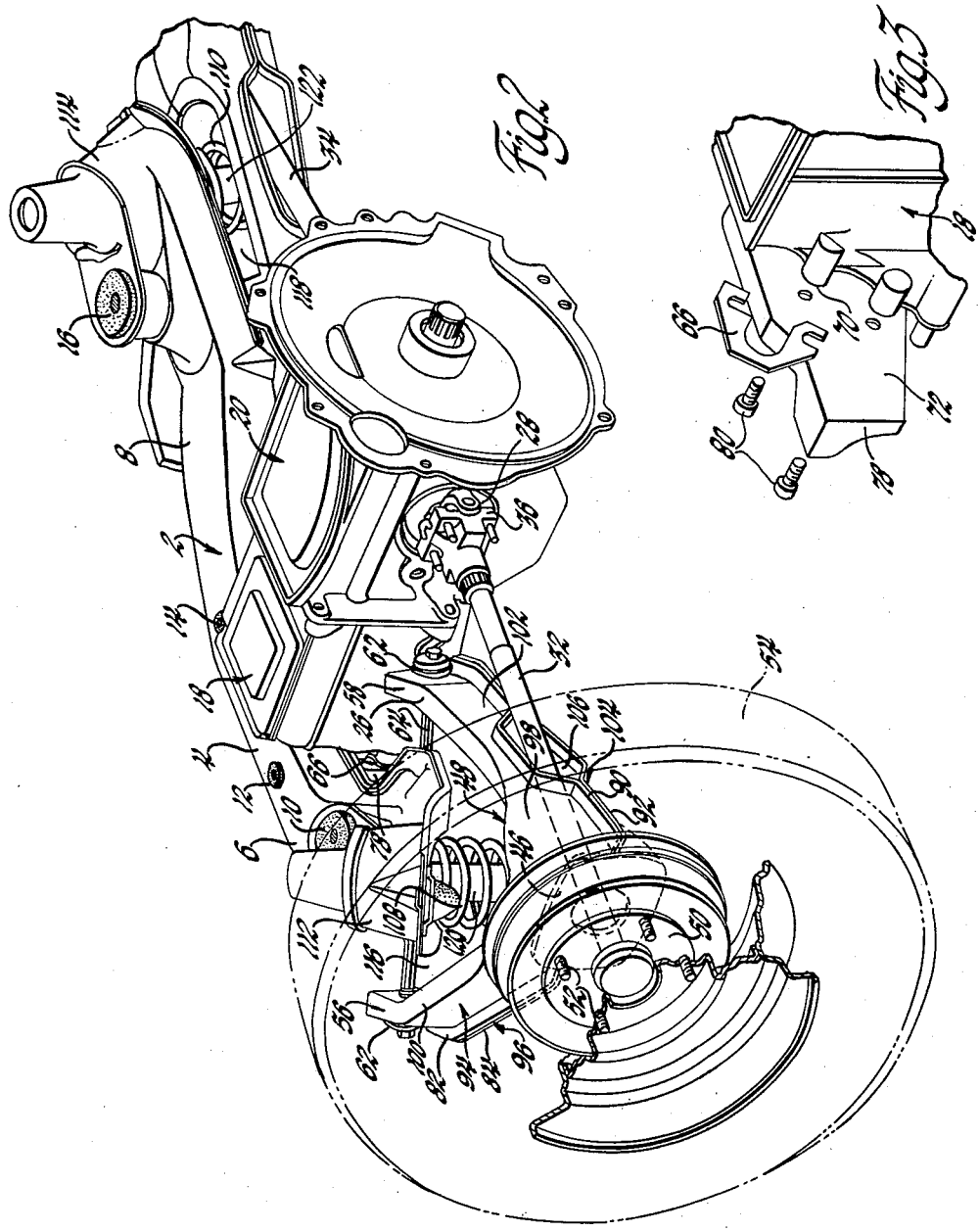

United States Patent Office 3,022,847
Patented Feb. 27, 1962

3,022,847
MOTOR VEHICLE CONSTRUCTION
Kai H. Hansen, Detroit, Robert Schilling, Bloomfield Hills, and John McRoberts, Ferndale, Mich., assignors to General Motors Corporation, Detroit, Mich., a corporation of Delaware
Filed Sept. 16, 1959, Ser. No. 840,371
8 Claims. (Cl. 180—64)

This invention relates to motor vehicle construction and more particularly to a unitary power plant, drive train, and suspension sub-assembly therefor.

The present invention is concerned primarily with vehicles of the type utilizing unit body and frame construction, wherein the engine, transmisison, differential, and driving wheels from a unit subassembly which is detachably mounted on the unit body and frame construction.

According to the general features of the invention, a chassis subassembly is provided which comprises a subframe member having a transversely extending central portion and laterally opposite rearwardly diverging swept back portions upon which are pivotally mounted correspondingly diverging wheel suspension control arms. Disposed entirely rearwardly of the subframe and longitudinally adjustably connected thereto is a rigid unit comprising the transmission, differential, and power plant, the differential occupying a position of transverse alignment with a pair of wheels which are mounted respectively on the outboard ends of the suspension control arms. Each wheel is operatively connected to the differential unit by means of a half axle which is articulably connected to the differential and rigidly connected to the wheels. Each control arm includes a hollow bulged end portion forming a cavity which is transversely aligned with the adjacent half axle. The inner side wall of each arm is vertically separated midway between the opposite ends thereof to form an obliquely elongated opening permitting the half axle to extend into the hollow interior of the control arm bulged portion for operative connection with the wheel. When in assembled relation, the described chassis subassembly is attached to the unit body and frame construction by a plurality of flexible mounts which are transversely spaced on the subframe member and a single flexible mount located at the rearward extremity of the engine unit.

An object of the invention is to provide an improved wheel suspension arrangement for a structure of the type described.

Another object is to provide a construction of the stated character incorporating independently suspended driving wheels operatively connected to the drive train by swinging half axles.

Still another object is to provide a simple and efficient means for adjusting the toe-in geometry in a wheel suspension of the type described.

A further object is to provide a construction of the stated character wherein the wheels are suspended on control arms which are pivotally mounted forwardly of the half axles on oblique axes which intersect the inboard connections between the half axles and the differential.

Yet a further object is to provide an arrangement of the type described wherein the power plant and drive train are rigidly connected together and are adjustable as a unit longitudinally relative to a subframe upon which the suspension control arms are mounted so as to permit installation and service adjustment of the horizontal angular position of the half axles and thereby establish a predetermined toe-in relation of the driving wheels.

Still another object is to provide an improved and simplified wheel suspension control arm for a construction of the type described.

Other objects, advantages, and features of the invention will become more fully apparent as reference is had to the accompanying specification and drawings wherein:

FIG. 1 is a plan view of a vehicle chassis subassembly according to the invention;

FIG. 2 is a partial perspective view of the structure shown in FIG. 1, with the power plant removed to more clearly reveal certain details of construction; and FIG. 3 is an enlarged fragmentary perspective view showing a detail of the construction of FIG. 2.

Referring now to the drawings and particularly FIGS. 1 and 2, there is shown a vehicle chassis subassembly which is adapted for complete assembly prior to attachment as a unit to a vehicle body and frame construction, not shown. The chassis subassembly comprises a subframe member 2 of generally rectangular cross section which includes a transverse central portion 4 and rearwardly diverging swept back end portions 6 and 8. Subframe member 2 is formed with vertically directed openings adapted to receive rubber mounts 10, 12, 14 and 16 which effect connection between the subframe and the unit body and frame construction, previously mentioned.

Disposed rearwardly of transverse central portion 4 of subframe 2 and connected thereto in a manner to be described is a transmission 18, differential 20, and power plant 22. Transmission 18 is rigidly attached directly to differential 20 which, in turn, is directly rigidly connected to power plant 22. At its rearward extremity, engine 22 is provided with an apertured ledge portion 24. Ledge portion 24 underlies and is flexibly connected to a bracket 26 formed on the body-frame unit.

Differential assembly 20 includes laterally oppositely extending output members 28 and 30 which are operatively connected to the inboard ends of half axles 32 and 34 by means of universal joints 36 and 38. Since all of the construction subsequently to be described is identical for both the right and left-hand side of the chassis subassembly, portions of the right-hand side have been omitted from the drawings and further description will be confined to the left side only, it being understood that the description applies equally to the right-hand construction. Near its outboard end, half axle 32 is formed with a journal portion 40 which is rotatably supported in a spherical bearing assembly 42. Bearing assembly 42 is mounted in a housing 44 which is rigidly attached to the outer surface of an apertured plate 46 welded on the outer extremity of a hollow sheet metal wishbone type wheel control arm 48. Immediately laterally outwardly of bearing assembly 42, axle 32 is formed with a flange 50 having a plurality of circumferentially spaced bolts 52 attached thereto, by means of which traction wheel 54 is rigidly connected to axle 32. Control arm 48 extends diagonally between wheel 54 and subframe 2 in alignment with and beneath swept back portion 6 and has forward bifurcated ends 56 and 58 in which are disposed flexible bushings 60 and 62. Bushings 60 and 62 pivotally engage opposite ends of a pivot shaft assembly 64, the midportion of which is bolted to subframe swept back portion 6. The projected axis of pivot shaft 64 intersects the geometric center of universal joint 36 at the inboard end of half axle 32. Since the deflection path of wheel 54 during rising and falling movement is determined by the projected axis of the pivot shaft and this axis is colinear with the geometric center of the universal joint, no increase or decrease in the length of the half axle occurs during wheel deflection and no variation in the horizontal angular relationship of control arm 48 and half axle 32 takes place. As a result of the construction shown, the half axle 32 requires neither a sliding spline connection nor an additional universal joint at the outboard end connection with the control arm.

One incidence of the oblique disposition of pivot shaft 64 is that both compression and rebound deflection of control arm 48 causes the wheel 54 to toe-in progressively. Accordingly, in the present invention the chassis subassembly is initially constructed so as to provide a simple and efficient method of adjusting and maintaining a predetermined degree of wheel toe-in when the vehicle is at curb weight so that both wheels rotate in planes substantially parallel to the vehicle longitudinal vertical mid-plane when the vehicle is subjected to normal passenger load. In accomplishing this purpose, it is important that the mode of adjustment provide ease of accessibility, both initially and in subsequent service. Further, the adjustment must be capable of influencing the toe-in of each wheel separately in order to compensate for normal manufacturing tolerances. As seen best in FIG. 1, the requisite wheel toe-in is accomplished by adjusting the longitudinal position of the transmission, differential, and engine unit relative to subframe 2 and interposing laterally spaced shim packs 66 and 68 between the abutting surfaces 70, 72 and 74, 76 at each side of the forward end of the transmission and the rearward face of depending bracket 78 on subframe 2 (FIG. 3). It will be appreciated that any longitudinal rearward movement of the transmission, differential, and engine unit relative to subframe 2 will impart corresponding rearward movement to universal joints 36 and 38 relative to the control arm bearing assemblies, with the result that the half axles will depart from an absolute transverse direction and impart toe-in to the associated wheels. Since the shim packs may be varied uniformly and differentially, the dissimilar toe-in of the wheels may be equalized by addition or subtraction of shims in one shim pack while the uniform toe-in adjustment thereafter may be accomplished by addition or subtraction of an equal number of shims in both packs. The spaced relation ultimately determined by shim packs 66 and 68 is subsequently maintained by tightening bolts 80 (FIG. 3) so that the shims are clamped between the forward face of the transmission and the rearward face of the depending bracket on the subframe.

According to another feature of the invention, wheel control arm 48 is a fabricated hollow sheet metal configuration affording maximum structural strength with minimum mass. In the prior art typical control arms utilized in comparable constructions are commonly formed with either a vertically or horizontally offset end portion to which is affixed a cylindrical hub in which the outboard end of the half axle is supported. However, because of the variety and magnitude of loads imposed on such control arms under various conditions of vehicle operation, it is extremely desirable that the geometric configuration of the arm be free of such angular changes. To achieve this end in accordance with the present invention, control arm 48 is formed by welding together overlapping perimetral abutting flanges 82—84, 86—88, and 90—92, of vertically registered upper and lower sheet metal stampings 94 and 96, respectively. Stampings 94 and 96 are generally V-shaped in plan form and the portions thereof between the flanges are deformed in cross section so as to provide a substantially bulged outer end portion 98 and raised rib inner leg portions 100 and 102. The bulged portion 96 is shaped so that the hollow cavity defined thereby is substantially vertically symmetrical with reference to the plane defined by the abutting flanges. Affixed by welding to the lateral boundary of bulged portion 98 is the generally rectangular wheel journal bearing mounting plate 44, previously mentioned. As pointed out previously, the free end of control arm 48 extends substantially rearwardly of half axle 32 and therefore a substantial portion of the arm intersects the axis of rotation of the axle. Accordingly, in order to provide operating clearance for the half axle and yet maintain maximum control arm strength, the abutting edges 90 and 92 along the rearwardly facing side 104 of control arm 48 are separated vertically to form an oblique horizontally elongated opening 106 substantially midway between the forward and rearward end of side 104. However, since in forming opening 106 continuity of flanges 90 and 92 is retained, little if any degradation in structural strength of the control arm occurs. To resiliently support the subframe and attached power plant and drive train relative to the wheels, coil springs 108 and 110 are disposed between hat shaped projections 112 and 114 on the subframe and the central depressed portions 116 and 118 in the respective control arms. Conventional hydraulic shock absorbers 120 and 122 arranged concentrically with springs 108 and 110 provide the desired degree of damping.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a motor vehicle, a chassis subassembly comprising, a subframe having a unitary engine, transmission and differential mounted thereon, a pair of laterally oppositely directed driving axles universally connected to said differential, a pair of generally triangular laterally spaced wheel suspension control arms pivotally connected to said subframe and extending diagonally rearwardly therefrom in a plane intersecting the axis of each of the adjacent driving axles, each of said control arms terminating in a flange portion surrounding said axle, axle journalling means mounted on said flange, and means forming a hollow passage in each of said arms aligned with said flange providing clearance for vertical deflection of said driving axles.

2. In a motor vehicle of the type utilizing unit body and frame construction, a subframe member flexibly connected to said unit construction at the rear thereof, said subframe having a transverse central portion and obliquely extending trailing portions, a hollow generally V-shaped wheel suspension control arm having spaced apart legs mounted on a pivot shaft connected to each trailing portion on an axis perpendicular to the direction in which the trailing portion extends, a unitary power plant and drive means connected at its forward end to the central portion of said subframe and at its rearward end to said unit construction, a drive axle rotatably supported on the outboard end of each control arm, means forming an opening in the sidewall of one of the legs of each control arm through which said shaft extends for connection at its inboard end to said drive means, a wheel fixedly secured to the outboard end of each axle, and spring means disposed between each control arm and the outer end of each trailing portion for resiliently supporting said vehicle relative to said wheels.

3. In a motor vehicle of the type utilizing unit body and frame construction, a subframe member extending transversely of said unit construction and secured thereto by a plurality of resilient connections, said subframe having a transverse central portion and outwardly and rearwardly swept back end portions, a wheel suspension control arm pivot shaft mounted on each swept back portion, a generally V-shaped wheel control arm pivotally mounted on each pivot shaft and extending beneath the adjacent swept back portion in vertical alignment therewith, spring means disposed between each control arm and the outer end of each swept back portion, a unitary power plant and drive means connected at one end to said subframe central portion and at the other end to said unit construction, laterally oppositely directed drive axles connected at their inboard ends to said drive means by universal joints, said control arms extending substantially rearwardly of a line passing through said universal joints and including hollow end portions terminating in laterally oppositely facing flanges each of which is formed with an opening transversely aligned with said universal joints, means forming an elongated opening in the side wall of each arm axially aligned with said first mentioned openings and said universal joints, bearing means disposed in said first mentioned openings and secured to the surrounding flanges, the outer end of each drive axle being supported in and extending through the adjacent bearing means, and a wheel rigidly connected to each axle at its outer extremity.

4. In a motor vehicle of the type utilizing unit body and frame construction, a subframe member extending transversely of said unit construction and secured thereto by a plurality of laterally spaced resilient connections, said subframe having a transverse central portion and outwardly and rearwardly swept back end portions, a wheel suspension control arm pivot shaft mounted on each swept back portion, a generally V-shaped wheel control arm pivotally mounted on each pivot shaft and extending beneath the adjacent swept back portion in vertical alignment therewith, spring means disposed between each control arm and the outer end of each swept back portion, a unitary power plant and drive means connected at one end to said subframe central portion and at the other end to said unit construction, laterally oppositely directed drive axles connected at their inboard ends to said drive means by universal joints, said control arms extending substantially rearwardly of a line passing through said universal joints and including hollow end portions terminating in laterally oppositely facing flanges each of which is formed with an opening transversely aligned with said universal joints, means forming a horizontally elongated opening in the side wall of each arm axially aligned with said first mentioned openings and said universal joints, bearing means disposed in said first mentioned openings and secured to the surrounding flanges, the outer end of each drive axle being supported in and extending through the adjacent bearing means, and a wheel rigidly connected to each axle at its outer extremity.

5. In a motor vehicle of the type utilizing unit body and frame construction, a subframe member extending transversely of said unit construction and secured thereto by a plurality of laterally spaced resilient connections, said subframe having a transverse central portion and outwardly and rearwardly swept back end portions, a wheel suspension control arm pivot shaft mounted on each swept back portion, a generally V-shaped wheel control arm pivotally mounted on each pivot shaft and extending beneath the adjacent swept back portion in vertical alignment therewith, a coil spring disposed between each control arm and the outer end of each swept back portion, a unitary power plant and drive means connected at one end to said subframe central portion and at the other end to said unit construction, laterally oppositely directed drive axles connected at their inboard ends to said drive means by universal joints, said control arms extending substantially rearwardly of a line passing through said universal joints and including hollow end portions terminating in laterally oppositely facing flanges each of which is formed with an opening transversely aligned with said universal joints, means forming a horizontally elongated opening in the side wall communicating with the hollow end portion of each arm and axially aligned with said first mentioned openings and said universal joints, bearing means disposed in said first mentioned openings and secured to the surrounding flanges, the outer end of each drive axle being supported in and extending through the adjacent bearing means, and a wheel rigidly connected to each axle at its outer extremity.

6. The structure set forth in claim 5 wherein each trailing portion of the subframe is provided with an integral dome portion in which the upper end of said coil spring is recessed.

7. The structure set forth in claim 5 wherein each of said control arms is formed of two abutting V-shaped sheet metal members having perimetral flanges permanently secured together.

8. The structure set forth in claim 7 wherein the said sheet metal members are shaped so that the legs of the V form hollow cavities communicate with the hollow end portion, and the perimetral flanges bounding one leg are separated vertically substantially midway between its opposite end to form said elongated openings.

References Cited in the file of this patent

UNITED STATES PATENTS

| 1,903,694 | Burney | Apr. 11, 1933 |
| 2,305,936 | Tjaardo | Dec. 22, 1942 |
| 2,689,014 | Nallinger et al. | Sept. 14, 1954 |
| 2,746,556 | Nallinger et al. | May 22, 1956 |
| 2,751,992 | Nallinger | June 26, 1956 |
| 2,756,834 | Dauben | July 31, 1956 |
| 2,836,254 | Boehner | May 27, 1958 |

FOREIGN PATENTS

| 1,076,337 | France | Apr. 21, 1954 |
| 434,311 | Italy | Apr. 24, 1948 |